W. H. ABEL,

Assignor of one-half to H. W. BOARDMAN.

KNITTING MACHINE.

No. 10,112. Reissued May 16, 1882.

WITNESSES

Ed. L. Dieterich

A. F. Krause

INVENTOR

William H. Abel

By his Attorney

E. S. Renwick

W. H. ABEL,

Assignor of one-half to H. W. BOARDMAN.

KNITTING MACHINE.

No. 10,112. Reissued May 16, 1882.

WITNESSES

Fred. G. Dieterich

A. H. Krause

By his Attorney

INVENTOR

William H. Abel

E. S. Renwick

W. H. ABEL,

Assignor of one-half to H. W. BOARDMAN.

KNITTING MACHINE.

No. 10,112. Reissued May 16, 1882.

WITNESSES

Fred. G. Dieterich

A. H. Long

By his Attorney

INVENTOR

William H. Abel

C. S. Kenrick

7 Sheets—Sheet 4.

W. H. ABEL

Assignor of one-half to H. W. BOARDMAN.

KNITTING MACHINE.

No. 10,112. Reissued May 16, 1882.

*WITNESSES*

Fred. L. Dieterich

A. H. Krause

*By his Attorney*

*INVENTOR*

William H. Abel

C. S. Renwick

W. H. ABEL,
Assignor of one-half to H. W. BOARDMAN.
KNITTING MACHINE.
No. 10,112. Reissued May 16, 1882.
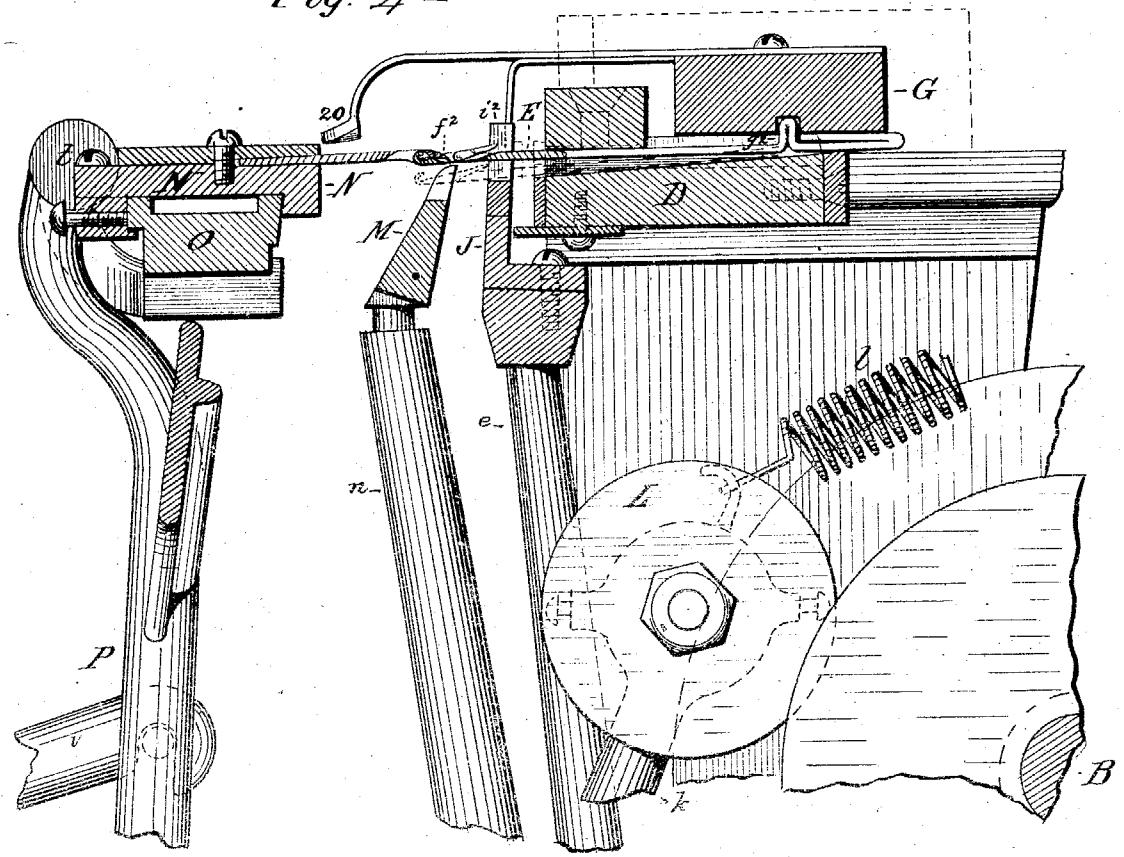
WITNESSES
Fred. L. Dieterich.
Geo. Binkenburg.
By his Attorney
INVENTOR
William H. Abel
by R. S. Lemicky

W. H. ABEL,
Assignor of one-half to H. W. BOARDMAN.
KNITTING MACHINE.
No. 10,112. Reissued May 16, 1882
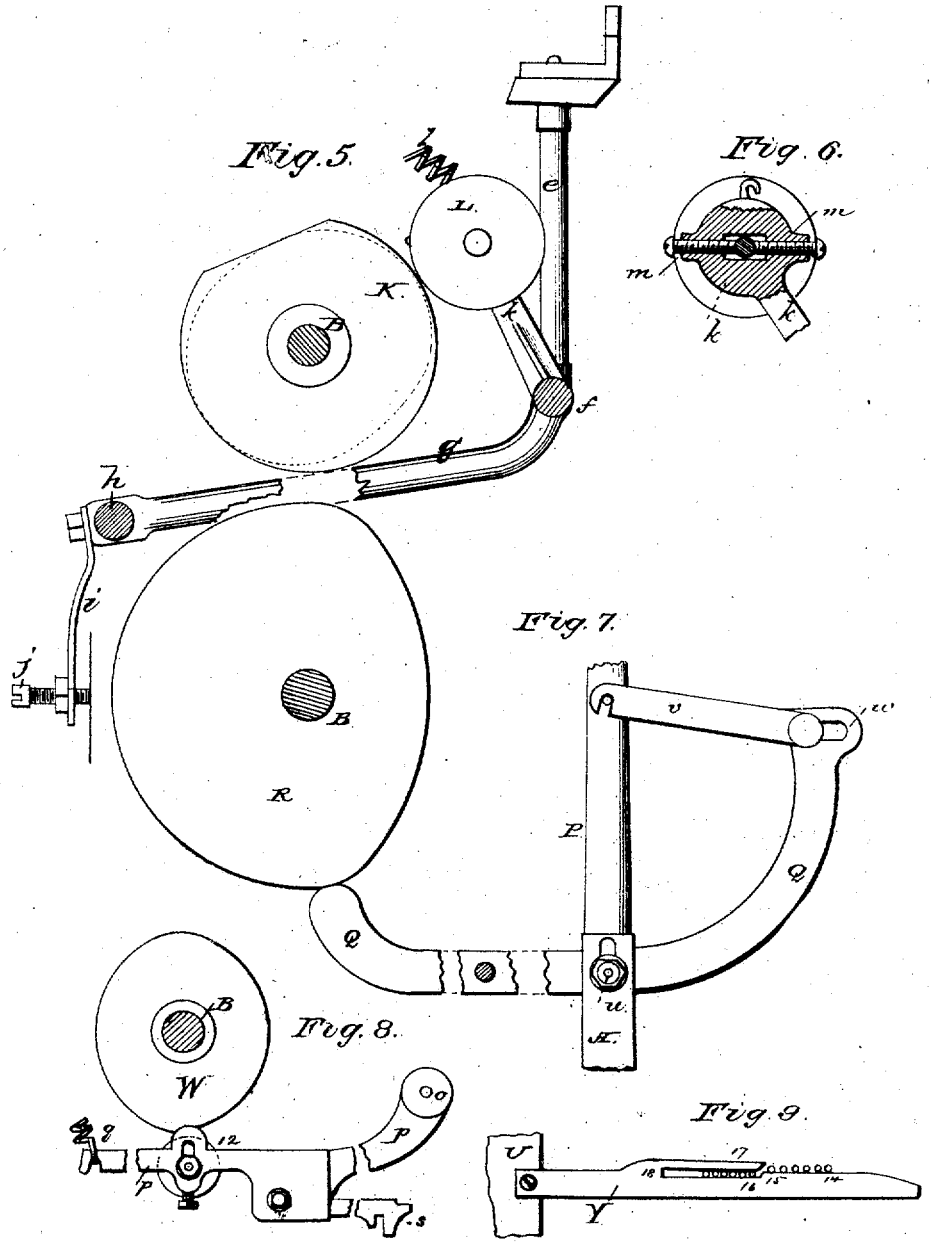
WITNESSES
Fred. G. Dieterich.
A. H. Krause
By his Attorney
INVENTOR
William H. Abel
E. S. Renwick

W. H. ABEL,
Assignor of one-half to H. W. BOARDMAN.
KNITTING MACHINE.
No. 10,112. Reissued May 16, 1882.
Fig. 11.
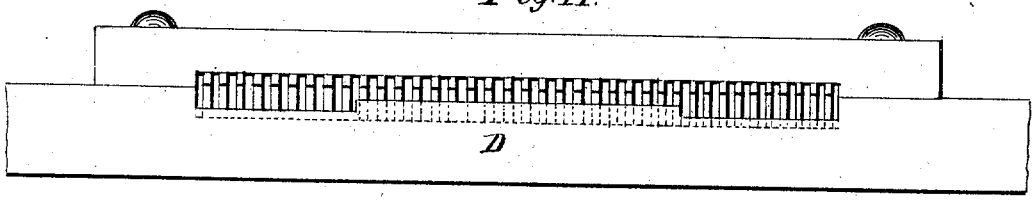
Fig. 12.
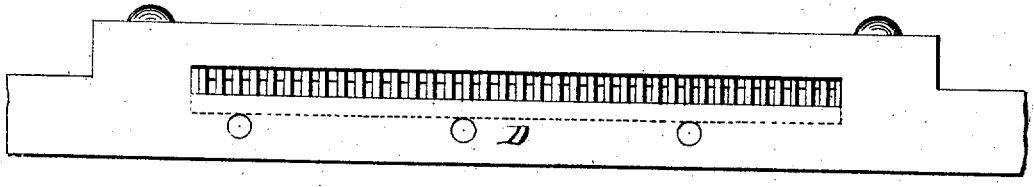
Fig. 14
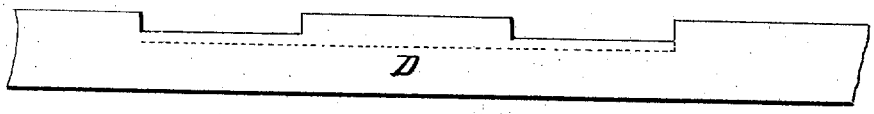
Fig. 16
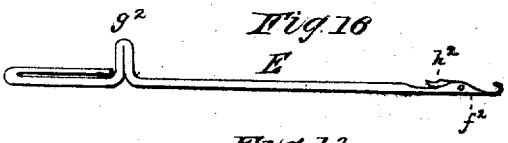
Fig. 19
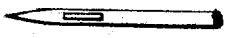
Fig. 13
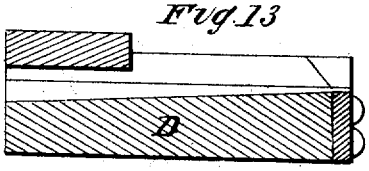
Fig. 15.
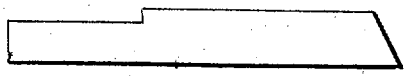
Fig. 17
Fig. 18.
WITNESSES
Fred. L. Dieterich
A. H. Krause
By his Attorney
INVENTOR
William H. Abel
E. S. Renwick

UNITED STATES PATENT OFFICE.

WILLIAM H. ABEL, OF LACONIA, NEW HAMPSHIRE, ASSIGNOR OF ONE-HALF TO H. W. BOARDMAN, OF LOWELL, MASSACHUSETTS.

KNITTING-MACHINE.

SPECIFICATION forming part of Reissued Letters Patent No. 10,112, dated May 16, 1882.

Original No. 187,696, dated February 27, 1877; Reissue No. 8,779, dated July 1, 1879. Application for reissue filed June 21, 1881.

*To all whom it may concern:*

Be it known that I, WILLIAM H. ABEL, of Laconia, in the county of Belknap, in the State of New Hampshire, have invented a new and Improved Self-Acting Narrowing Knitting-Machine; and I do hereby declare that the following is a full and exact description thereof, reference being had to the accompanying drawings, making part of this specification—

Figure 1:
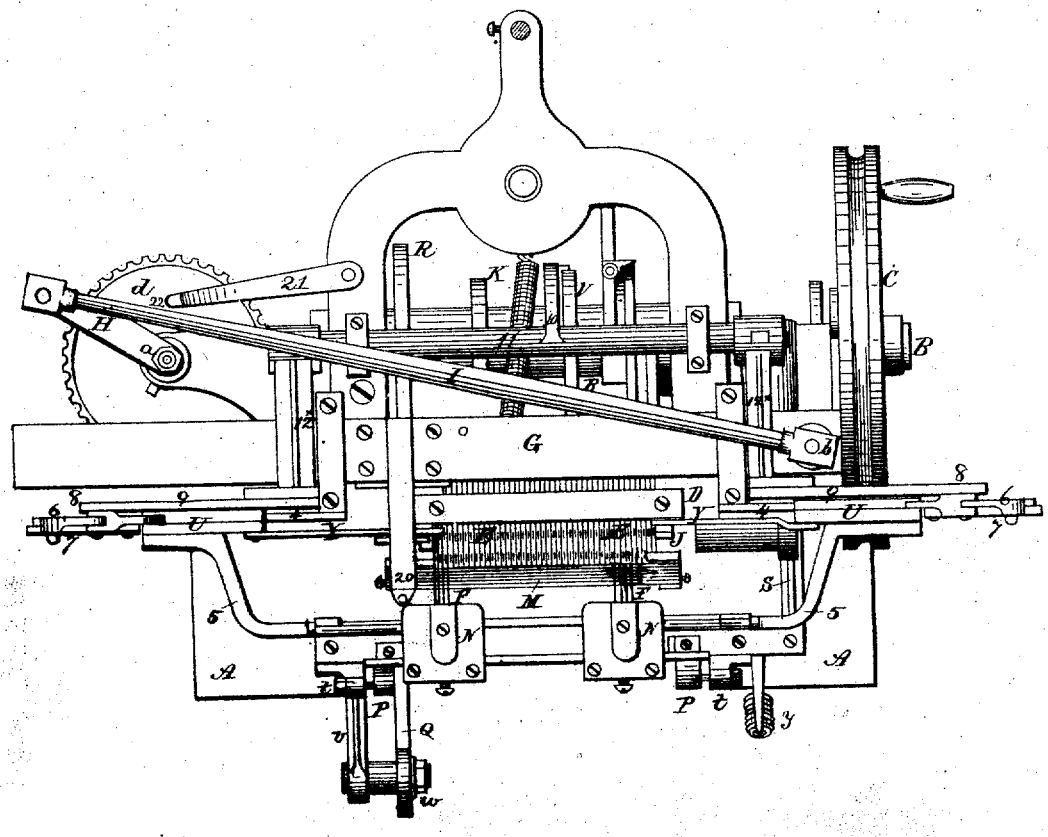
Figure 2:
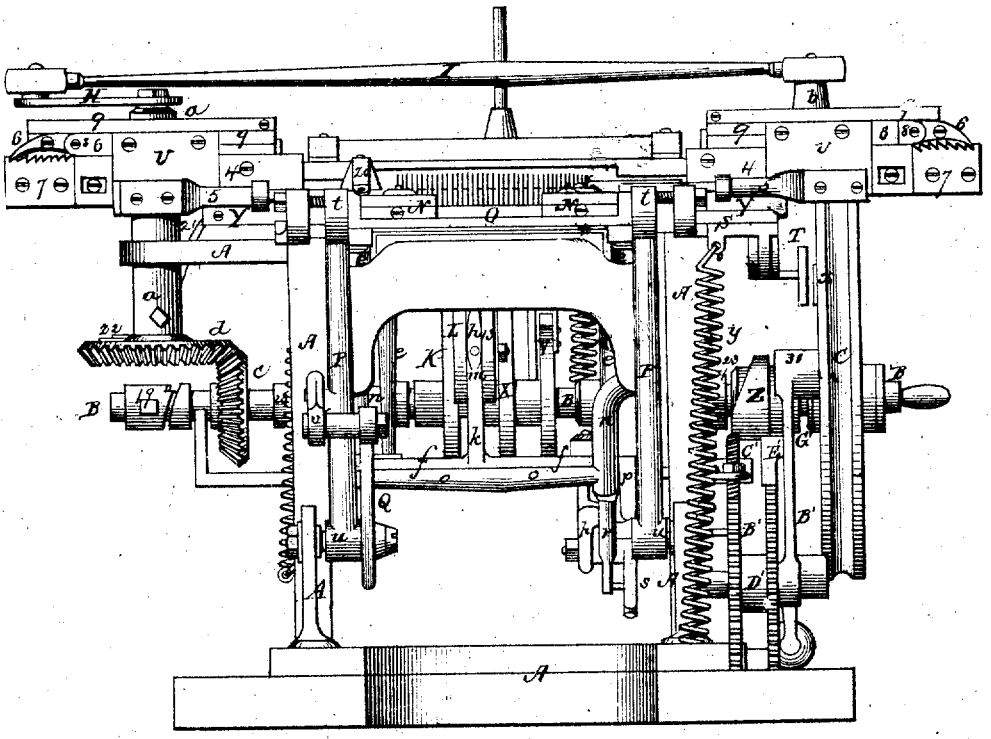
Figure 3:
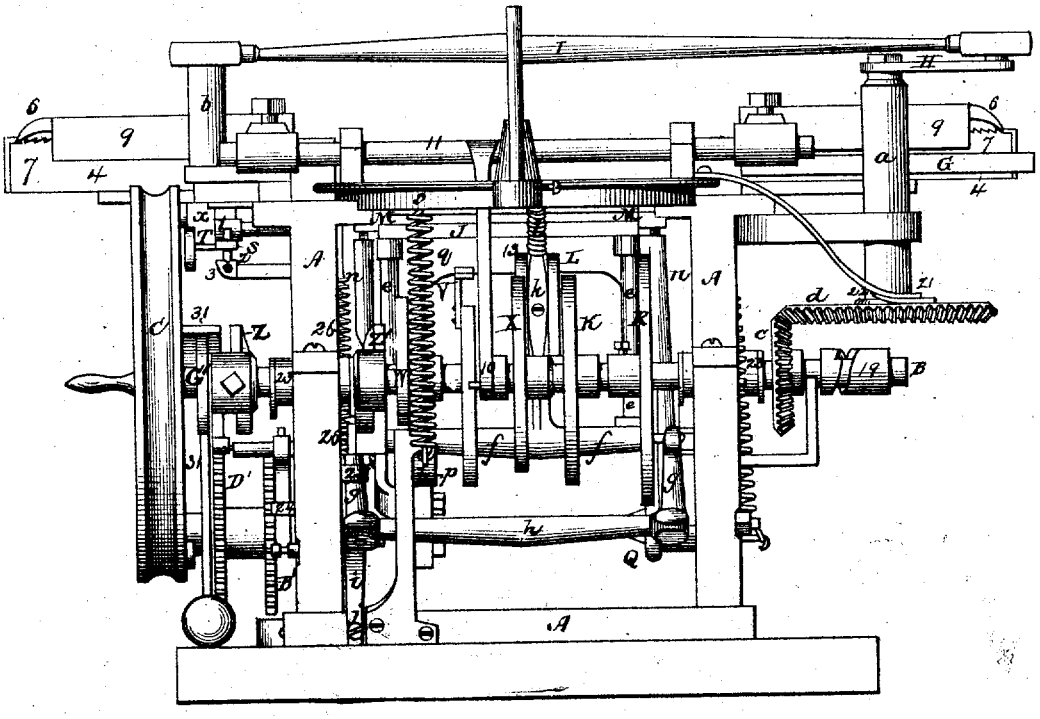
Figure 4:
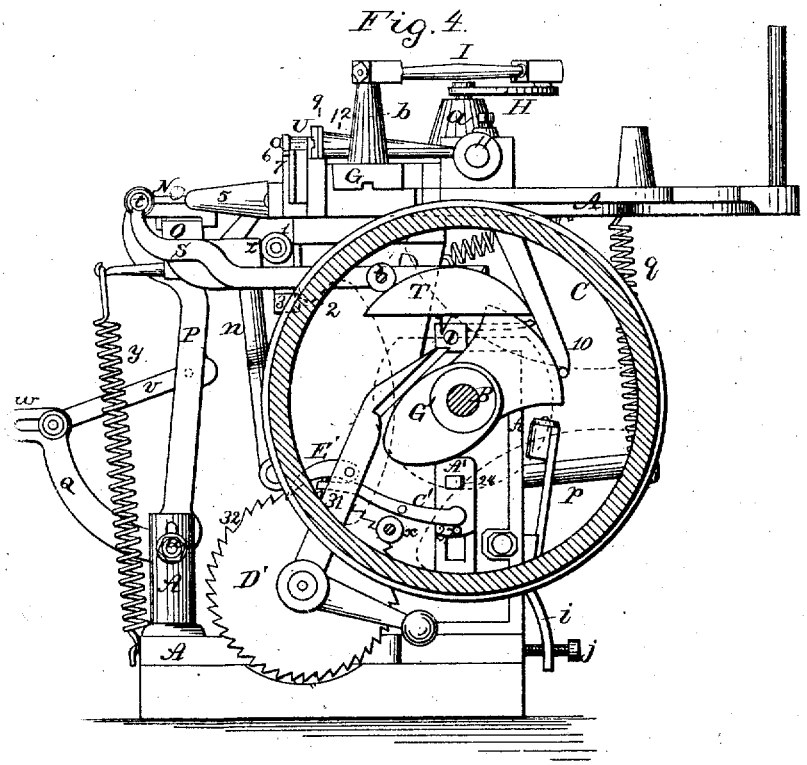

Figure 1 being a top view of the machine; Fig. 2, a front view of the same; Fig. 3, a rear view thereof; Fig. 4, an end view of the same, the driving-pulley being in section; Fig. 4ª, an enlarged transverse section of parts of the machine. Figs. 5 to 21, inclusive, are views of parts of the machine detached.

Like letters designate corresponding parts in all of the figures.

The purpose of my invention is to produce an improved self-acting narrowing knitting-machine for making shaped goods, whereby the machine itself may be greatly simplified and cheapened, the presser which is used with spring-needle fashioning-machines and the mechanism for operating it being dispensed with, and the needles being much stronger and less liable to break, whereby also the knitting can be done much more rapidly than with the spring-needle narrowing-machines heretofore generally used, whereon almost any quality of yarn may be employed in knitting, and whereby the highly-skilled labor required with other narrowing-machines may be rendered unnecessary.

My invention consists of certain combinations of mechanical devices which are specified in detail in the claims at the close of this description. These devices are the following, viz: a peculiar latch-needle having a flaring slot or eye between the hook-point of the needle and its latch-pivot, said eye being adapted to receive the point of the transferring-instrument by which the loop of yarn is taken from the needle and is reapplied to it; (this peculiar kind of needle is designated by me an "eye-pointed latch-needle," and a series of these peculiar needles is an essential member of each of the new combinations which constitute my invention;) the covering-point or transferring-instrument by which the loop or stitch of yarn is transferred from one needle to another for the purpose of narrowing the fabric, such covering-point corresponding with what are commonly called "ticklers" and "transferring-instruments" by knitters; the rocking bar by means of which the covering-point or tickler is depressed and raised so as to be engaged in the eye of the eye-pointed latch-needle over which it is placed, and to be disengaged therefrom; the back sinker-bar, by means of which the loop of yarn on one of the series of eye-pointed latch-needles is moved from the needle on which it is formed to the covering-point or tickler; the front sinker-bar, by means of which the loop of yarn on the covering-point or tickler is moved from it to one of the eye-pointed latch-needles of the series; a slide for lowering and raising the needles which are to be thrown out of work as the fabric is narrowed, or put at work as required; a pattern-wheel or its substitute for determining the times when the transference of stitches by the covering-points or ticklers is to be effected; a needle-bar for holding the needles in such manner that those from which the loops are removed may be lowered out of range of the yarn-guide by which yarn is delivered to the needles for knitting.

The peculiar construction of the eye-pointed latch-needle is not claimed in this patent, nor is any other one of the above-named devices claimed as new of itself, the improvements which are claimed being the novel combinations of the said devices invented by me, as specified in the claims. In order that these combinations may be fully understood, I have represented in the accompanying drawings and will proceed to describe a machine in which I embodied them previous to the date of my application for the original patent, said machine having the narrowing devices duplicated at opposite ends of the series of needles, so that the fabric may be narrowed at each side.

In the drawings, A represents the frame of the machine, of any suitable construction; B, the driving-shaft, extending across the machine from end to end, and receiving most of the actuating parts of the machine, or those parts by which motion is applied to the devices which operate upon the yarn and do the knitting; C, the driving-pulley on the driving-shaft; D, the needle-bar, receiving any required number of latch-needles, E E; and G, the sliding bar, bearing the cam which operates the needles, and having a longitudinal reciprocating movement over and a little back of the needle-bar.

The eye-pointed latch-needles are represented detached at Figs. 16, 17, and 18. Each has a hook-point and a latch, $h^2$, which is pivoted to the stem of the needle back of its point, and which can be swung forward to cover the hook-point, or can be swung back, as shown at Fig. 17, so as to permit the loop of yarn to be moved backward to the stem of the needle behind the latch. Between the pivot of the latch and the hook-point there is a flaring slot or recess, $f^2$, forming what is commonly called an "eye," and the distinguishing characteristics of this needle are that it is a latch-needle and that it has an eye between its latch-pivot and its point. Each needle-stem is provided with an upper projection or nib, $g^2$, upon which the cam carried by the sliding bar G operates for the purpose of moving the needle in the needle-bar D. Each needle is also fitted with a projecting tail, $d^2$, which is advantageous in keeping the needle in its line of travel when at work.

The needle-bar D (represented detached at Figs. 11, 12, 13, and 14) has a series of grooves in it, in which the needles slide, and the needle-grooves at the ends of the series, which correspond with the needles that are to be thrown out of work for narrowing the fabric, have bottoms inclined from the rear of the needle-bar to its front, as seen in Fig. 13, so that the points of the needles may be dropped or depressed when they are to be put out of work. In the machine represented these grooves of the needle-bar are formed by inserting thin fillets of steel (such as are represented at Fig. 15) into slits cut crosswise in the needle-bar.

The sliding bar G carries the cam for moving the needles to and fro in the needle-bar, and also the yarn-carrier or yarn-guide 20, by means of which yarn is delivered to the needles between their hook-points and their latches. The reciprocating movement of the sliding cam-bar G is effected by means of a revolving crank, H, mounted on a vertical shaft, *a*, near one end of the machine, and a connecting-rod, I, extending from the crank-pin to a pivot, *b*, on the sliding cam-bar near the other end of the machine, so that as great a length may be given to the connecting-rod as practicable. The crank H is driven by two bevel-gears, *c d*, respectively on the driving-shaft B and on the crank-shaft, the former being just half as large as the latter, whereby a reciprocating movement in either direction is given to the sliding cam-bar at each revolution of the driving-shaft, and the motions of all the operative parts of the machine are properly timed.

Figure 20:
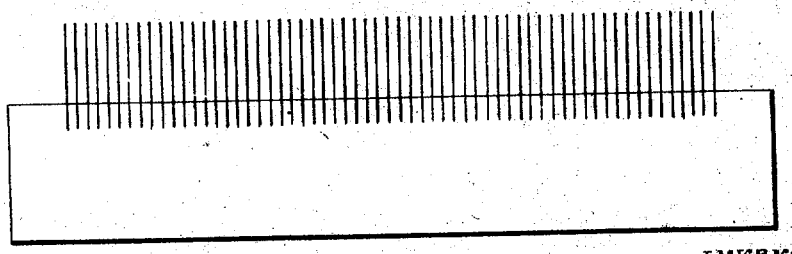

In the machine represented in the drawings the back sinker-bar, J, has the form represented at Figs. 20 and 4ⁿ, it being a bar with projections or sinkers $i^2$, which, when the sinker-bar is in place in front of the needle-bar D, are adapted to protrude upward between the needles of the series, so that during knitting the yarn is bent across the edges of the sinkers into loops or stitches, the lengths of which are determined by adjusting the back sinker-bar by the means hereinafter described. This back sinker-bar, J, is mounted on two standards, *e e*, projecting upward from a rock-shaft, *f*, which is pivoted to the front end of arms *g g*, reaching back and attached to an adjusting rock-shaft, *h*, at the rear side of the machine, and provided with an adjusting-arm, *i*, and screw *j*, as shown in Figs. 3 and 4, whereby the sinkers are raised and lowered. The ordinary forward and backward movement of this sinker-bar—that is, its movement for plain knitting—is produced by means of a cam, K, Figs. 3 and 5, on the driving-shaft operating against an anti-friction wheel, L, on an arm, *k*, of the rock-shaft *f*. The cam is perfectly circular and concentric with its shaft, except one depression in its edge, to allow the sinker-bar to move backward at the proper time by the action of a counter-spring, *l*. At all other times the sinker-bar is held by the circular part of the cam steadily and constantly to the work. The sinker-bar is adjusted to make closer or looser stitches by means of two counter adjusting-screws, *m m*, (see Fig. 6,) acting against the laterally-movable pivot of the anti-friction wheel L, there being a laterally-extended slot in the arm *k* to allow the position of the said anti-friction wheel to be varied on the arm. This is a simple and convenient means of adjustment and capable of great accuracy.

Figure 21:
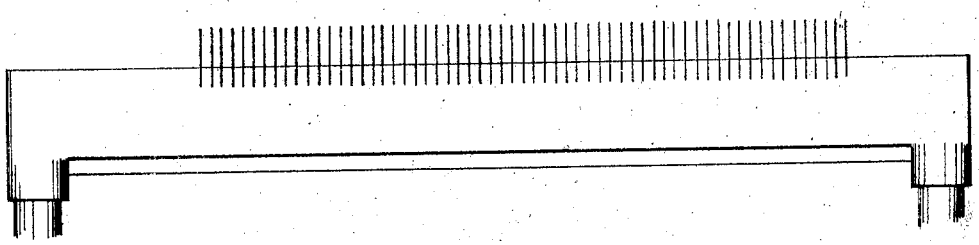

The front sinker-bar, M, as shown at Figs. 21 and 4ⁿ, is similar in construction to the back sinker-bar above described. This front sinker-bar, M, also is mounted on two standard-arms, *n n*, which are attached to a rock-shaft, *o*, turning in suitable bearings on the frame, from which rock-shaft a suitable arm, *p*, extends backward, a spring, *q*, extending from the rear end of the said arm to a stationary part of the machine, to hold the sinker-bar in the right position in front of the work, the device being adjustable by a set-screw, against which the arm bears. Since the only function of the front sinkers in ordinary knitting is to hold the work to the back sinkers and allow the needles to perform their office without displacing the loops, no operative motion of the front sinker-bar is required for plain knitting.

For convenience in putting on the work with the hook-bar, for taking up stitches, and repairing the work, the front sinker-bar is provided with means which permit it to be swung forward out of the way when such operations are to be effected, such means consisting of a downwardly-projecting arm, *r*, on the rock-shaft *o*, and a hook-catch, *s*, pivoted to the arm *p*, and catching on a pin on the said arm *r* to couple the rock-shaft rigidly thereto, and thereby cause the same to move with the arm *p*; but on detaching the catch *s* from its pin, the rock-shaft is left free to turn and allow the front sinker-bar to be moved forward away from the work.

The mechanism and movements thus far described belong to what I designate the "latch-needle knitting-machine proper"—that is to say, they are adapted to the knitting of plain work by the operation of latch-needles; but all the parts are also adapted to operate in combination with what I designate the "narrowing-machine proper," the eye-pointed latch-needles being specially adapted to this purpose by reason of the eyes between their points and the pivots of their latches.

What I designate the "narrowing-machine proper" consists of the covering-points F F, their sliding blocks N N, by means of which said points are moved laterally from one needle to another, and the rocking bar, by whose action the said points are engaged in and are removed from the eyes of the eye-pointed latch-needles. These parts are all mounted on a swinging frame, P, to which the rocking bar O is pivoted at *t t*, and the said frame is pivoted at *u u* to a suitable part of the main frame. In order that this frame may be swung forward out of the way when necessary, a cam-arm, Q, is secured to the frame P by pivoting at one of the pivots *u u*, and by a notched catch, *v*, pivoted to a forward projection of the arm and catching over a pin on the frame P, so that the narrowing-machine may be uncoupled from and coupled to its cam-lever at will. The attachment of the pivot of the catch *v* is adjustable in a slot, *w*, of the arm Q, whereby the position of the parts and limits of the movements of the narrowing-machine may be adjusted and determined. The reciprocating backward and forward movement of the narrowing-machine is effected by a cam, R, on the driving-shaft B acting on the rear end of the arm Q.

The covering-points F F, as represented at Figs. 4ª, 17, and 19, do not differ substantially from the ticklers or transferring-instruments usually employed in spring-needle narrowing knitting-machines, each being a pointed instrument, with an eye in its under side, a little behind its point, so that when the covering-point, after being placed over a needle, is depressed, its point is engaged in the eye $f^2$ of the latch-needle, while its own eye receives the hook-point of the latch-needle, so that the loop of yarn or stitch can then be readily slid from the needle to the covering-point, or from the latter to the former. In the machine represented in the drawings four covering-points are applied at each side of the machine, so as to produce a selvage four stitches in width at each side of the narrowed fabric; but such employment of four covering-points does not constitute any part of my invention.

The up and down movements of the covering-points, to cover and uncover the latch-needles after being brought over the said needles, as indicated in Fig. 1, are produced by rocking the bar O on its pivots *t t*. From the said bar an arm, S, extends backward, and bears a stationary cam, T, which lies within reach of two anti-friction rollers, *x x*, which are pivoted to the inner side of the driving-pulley C, as shown in position in Fig. 4. As the driving-pulley revolves these anti-friction rollers ride over the cam T and depress the arm S, thereby rocking the back edge of the bar O downward and bringing the covering-points down upon the needles, as shown in Figs. 17 and 4ª—first, to take off the loops from their needles, and, second, to deliver them to the next needles; and as soon as the rollers pass from the cam a counter-spring, *y*, operates to raise the arm S, thereby rocking the bar O in the opposite direction, and by consequence raising the covering-points. When the covering-points are depressed by the rocking bar O each covering-point is engaged in the eye of the latch-needle which it covers, and when the rocking bar is rocked in the opposite direction each covering-point is disengaged or removed from the eye of the corresponding eye-pointed latch-needle.

It is essential to the operation of the machine represented in the drawings that the covering-points, when brought over the needles, should be held securely in exact position, without the possibility of getting out of place during the narrowing movements. I provide a lock which effects this very perfectly. Upon the top of the arm S is formed or attached a stop, *z*, abutting at the rear against an anti-friction roller or equivalent stop, 1, on the frame A, when the covering-points are brought into position over the needles, as shown in Fig. 4. Then, as the arm S is lowered by action upon its cam T, another stop, 2, on the under side of the said arm, facing forward, moves downward close behind or in contact with a fixed projection, 3, of the frame. Thus when the covering-points go down upon the needles there is no possibility of their moving either forward or backward.

The lateral movements of the covering-points to take the stitches or loops from their needles and transfer them to the next inner needles for narrowing are effected by the following means: Blocks or carriages U U are arranged to slide on fixed ways 4 4. On these blocks respectively are secured arms 5 5, which reach to the outer edges of the sliding blocks N N, which carry the covering points; also, to the outer ends of the blocks U U are respectively pivoted jointed pawls 6 6, which take into fixed ratch-bars 7 7, secured to the said ways, or to the frame of the machine. The notches in these ratch-bars are just as far apart as the needles from center to center, so as to produce an exact and uniform movement of the covering-point slide-blocks, whereby at each time when the pawls 6 6 are shifted from one notch to the next inner notch of these ratch-bars the covering-points are moved precisely from one needle to the next inner needle in order. The pivot-pins 8 8, by which the two parts of the pawls respectively are pivoted together, project backward into horizontal grooves or lifters 9 9, located just back of and parallel with the ways 4 4. The said grooves allow these pivot-pins to slide freely, and by raising the lifters at the proper moments to a certain extent the pawls are thereby lifted at their joints and shortened sufficiently to draw their points from their notches in the ratch-bars into the next inner notches thereof. Then on again depressing the lifters so as again to straighten the pawls the rack-blocks U U, and consequently the blocks N N, carrying the covering-points, are moved inward a distance equal to the distance between two adjacent needles, as required.

The lifters 9 9 are actuated by a hooked or hooded cam, V, Fig. 4, on the driving-shaft B catching around a projection on the lower end of a downwardly-extending arm, 10, on a rock-shaft, 11, which is pivoted in a suitable position, as shown, to the frame of the machine, and bears the two lifters on projecting arms $12^{x}$, secured to it. The cam vibrates the rock-shaft 11 at the proper time just sufficiently to raise the lifters to the extent desired. The edge of the cam then strikes the arm 10, vibrates the rock-shaft 11 in the opposite direction, and brings the lifters down into place again.

The movements of the front and back sinker-bars in connection with the covering-points and needles in narrowing are peculiar. When the covering-points are moved backward over the needles for narrowing the front and back sinker-bars both move backward, carrying the sinkers between the needles—the front sinkers for sliding the loops of yarn back upon the needles beyond the pivots of the latches, to move and hold the latches away from the covering-points, and to give room for the said covering-points to come down upon the needles in front of the loops, and the back sinkers to give way for the work and to get into position for its next forward functional movement. Then, as soon as the covering-points are brought down upon the needles, both sinker-bars move forward—the back sinkers to push the loops upon the covering-points and the front sinkers to give way for the work and to get into position again. Next, the back sinker-bar recedes a little to allow the covering-points to raise the loops, and then immediately comes forward again to push the loops farther upon the covering-points to insure their retention thereon and certain delivery to the adjacent needles. The back sinker-bar then moves backward to allow the covering-points to move laterally and carry the loops to the next inner needles. Then the front sinker-bar moves backward to push the loops from the covering-points back upon the needles beneath. Finally both sinker-bars come forward into position for knitting, and at the same time the covering-points move forward to be out of the way while the knitting proceeds till it is time to commence the next narrowing. All these movements are determined automatically by the machine itself, the backward movement of the back sinker-bar to allow the covering-points to move laterally being necessary only when its projections are high, (as they are in the machine represented in the drawings,) and when the covering-points are not raised high enough to pass laterally over them.

To effect these movements of the front and back sinker-bars, cams on the driving-shaft B are employed. A cam, W, acting upon an anti-friction wheel, 12, on the arm *p*, effects the movements of the front sinker-bar, as described, there being two operating projections on the cam to move the sinker-bar backward twice in the revolution of the driving-shaft. A cam, X, acting upon an anti-friction wheel, 13, on the arm *k*, effects the movements of the back sinker-bar. This cam also acts twice to move the sinker-bar forward at each revolution of the driving-shaft, and it also has a depression in one throwing projection of its periphery to effect the slight receding movement of the sinker-bar to allow the covering-points to lift the loops before fully pushing the loops thereon, as above described. This cam X is entirely distinct from cam K, which controls the movements of the back sinker-bar in knitting, and the anti-friction wheel 13, against which the cam X acts, is entirely distinct from the anti-friction wheel L, against which the cam K operates; but it is on the same pivot as that and adjusted by the same means.

In narrowing, as fast as the loops are taken from the outermost needles the said needles are required to be moved from their position a sufficient distance not to take the yarn again as the yarn-carrier passes over the needles in knitting. To effect this purpose the said needles are caused to drop down into a position a little lower than the plane of the needles for knitting. The means of effecting this movement consists of a slide, Y, attached to each rack-block U, and reaching inward therefrom to the needles, and having the following construction, (see Fig. 9;) A portion, 14, at the inner end of each slide has its upper edge just high enough to hold the needles which rest thereon at the proper height for knitting, the slides being the sole support for the front ends of those needles which are subject to depression from their usual height in narrowing. At the outer extremity of this portion of the slide there is a downward inclination, 15, to a portion, 16, of the slide, which holds the needles at a height far enough below the needles on the part 14 to be out of the way in knitting, as desired. Over the part 16 is a projecting arm or part, 17, of the slide, which forms a slot, 18, the entire length of the said part 16, just wide enough for the needles to move freely in and be prevented from lifting out of position, as shown clearly in Fig. 9. The inclination 15 is such as to act as a cam to raise the needles out of the groove or slot 18 upon the raised part 14 when the slide recedes from under the needles after each nar-

BEST AVAILABLE COPY rowing; and the inclination of the inner end of the projection 17 is nearly parallel with the inclination 15, so as to act, in connection with the weight of the needles, to cause them to descend into the slot without failure in narrowing. The position of the inclination 15 is such that as the slide moves inward correspondingly with the movement of the covering-point sliding blocks N N, (driven inward by the projecting arms 5 5 of the rack-blocks U U,) and as the loops are taken one by one, successively, from the needles in narrowing, each needle, as soon as the loop is taken from it, drops down into the slot 18, out of the way; and when the slides Y Y are drawn outward after the narrowing is completed all the needles which had dropped one by one into each slot 18 are thereby again brought out upon the raised part 14 of the slides, ready for knitting the full width again, or for another narrowing.

The operations of the two organizations designated by me "the latch-needle knitting-machine proper" and the "narrowing-machine proper," above described, are entirely distinct and alternate with each other—that is to say, the latch-needle knitting-machine proper may be worked distinctly from the narrowing-machine proper, and when so worked will produce a sheet of knitted fabric of uniform breadth; and when the narrowing-machine proper is brought into action the formation of stitches upon the needles from and to which a stitch is to be transferred (for narrowing the fabric) is temporarily intermitted until the transfer is effected.

It remains to describe the means by which the narrowing devices are automatically brought into action when required to narrow the fabric at predetermined rows of stitches.

Upon the driving-shaft B the cam K, which controls the back sinker-bar while knitting, and the bevel-gear wheel *c*, which operates the sliding needle cam-bar G through the crank H and connecting-rod I, operate their respective devices during plain knitting; and the hooked or hooded cam V (which causes the movement of the rack-blocks U U) and the cams W X (which respectively operate the front and back sinker-bars simultaneously, or in harmony together) operate their respective devices for narrowing the fabric. The cams are so located on the driving-shaft that by moving the said shaft lengthwise a distance somewhat more than the thickness of the cams, one way or the other, either the cam K is brought into action or the cams V W X, as the case may be; also, when the driving-shaft is moved to throw the cams V W X into action for narrowing, the bevel-wheel *c*, which drives the needle cam-bar, is uncoupled from the said shaft, since the said cam-bar must be at rest while narrowing. This uncoupling is effected by having a clutch, 19, secured fixedly to the driving-shaft, arranged to separate from its counterpart on the said bevel-wheel when the shaft is moved endwise to bring the narrowing mechanism into action. Then, when the driving-shaft is moved in the other direction, to throw the narrowing mechanism out of action, the said clutch engages with the bevel-wheel *c* again and brings the cam-bar into action.

With a knitting-machine constructed, as represented in the drawings, with narrowing devices at each end of the series of needles, arranged to operate simultaneously, it is in my opinion essential that the sliding cam-bar G, which bears the yarn-carrier 20, should be at the extremity of its movements, or nearly so, when the uncoupling of the bevel-wheel *c* takes place and the movements of the said cam-bar are suspended for narrowing. Otherwise the yarn-carrier would be left over the needles and the narrowing could not proceed. This proper stopping of the cam-bar is very easily and naturally effected by arranging the clutch 19 so that it becomes completely detached from its counter-clutch on the bevel-wheel *c* only at the very extreme of the sliding movement of the driving-shaft in that direction; but, should the bevel-wheel *c* be turned to any considerable extent from its position during the time of its being uncoupled, disarrangement of the machine would take place, and the wheels would not become automatically coupled again. To obviate the liability of this happening, I employ a spring, 21, secured to the frame A, and bearing slightly on the top of the bevel-wheel *d*, which gears into the said bevel-wheel *c*, thus acting as a brake to keep the said bevel-wheels in position while uncoupled. The pressure of this spring-brake is not sufficient to practically impede the motions of the parts when in action. A pad, 22, may be applied to the foot of the spring to prevent unnecessary rubbing and friction on the bevel-wheel *d*.

To enable the driving-shaft B to have the sliding movement necessary for bringing the cams into the proper position for actuating the devices upon which they respectively operate, it is preferable to mount it in bearings 23 23, which themselves have a sliding movement of the requisite extent in the frame of the machine, these bearings being V-shaped at the bottom to slide in corresponding V-shaped ways, which always wear centrally and keep the bearings always accurately fitted therein.

The sliding movement of the driving-shaft is effected by two cams, Z Z′, secured thereto, one at one side and the other at the other side of one of the uprights of the frame A. These cams act respectively against two projections, 24 and 25, on a shifting block, A′, Fig. 4, which has an up-and-down sliding movement in a slot in the said standard of the frame. When the cam Z strikes the projection 24 of the shifting block, the latter being stationary, the cam itself must move, and with it the driving-shaft, the movement produced thereby being as much as the distance the said shaft is required to be moved endwise, and when the cam Z′ strikes the projection 25 the cam itself, and the driving-shaft with it, for a similar reason, are moved in the other direction to the extent required. The projections 24 and 25 are at different heights, so that when the shifting block is raised to its highest position the projection 24 is brought opposite to the cam Z, and causes the said cam to throw the driving-shaft nearest toward that end of the machine where the cam is located, and into the position for knitting, and keeps the shaft there while the knitting continues, the projection 25 during the time being entirely above and out of contact with the cam Z′, and when the shifting block is moved to the extremity of its downward position the projection 24 is brought below and out of contact with its cam Z and the projection 25 is brought opposite to the cam Z′, which then and thereby is made to throw the driving-shaft endwise in the other direction, thus bringing the narrowing mechanism into action. A simple spring, 26, serves to raise and to hold raised the shifting block.

Figure 10:
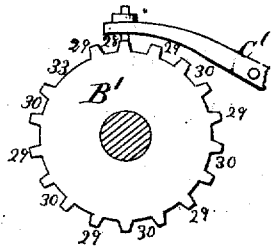

The depression of the shifting block to bring the narrowing mechanism into action is effected by the following device: A pattern-wheel, B′ I, Figs. 2, 3, and 10, is mounted on the frame A in front of the shifting block, and a connecting-lever, C′, is pivoted to the frame between the two. One end of the lever plays between two projections of the shifting block, one of which may be the projection 24 and the other a projection, 27, below the lever C′, bearing and operating on the latter. The other end of the lever has an adjustable cam-point, 28, which bears upon the edge of the pattern-wheel, so that the lever may be acted on thereby. The pattern-wheel has cam-projections 29 29, each sufficient to raise the forward end of the lever C′, and consequently depress the shifting block to its lowest position, while the spaces 30 30 between these cam-projections are deep enough to receive the cam-point on the lever and permit the lowering thereof, so as to allow the shifting block to be raised to its highest position by the spring 26.

The distances between the cam-projections 29 29 are to be according to the form of narrowing required. If the narrowing is to be uniform, the distances are uniform. If the narrowing is to be irregular, the distances are irregular.

The revolving motion of the pattern-wheel is regular, being produced, as shown in the drawings, by a ratchet-wheel, D′, secured to the shaft of the same, into the teeth of which works a pawl, E′, pivoted on an arm, 31, that vibrates on the shaft of or on a pivot concentric with the pattern-wheel and ratchet-wheel. Against the upper end of the pawl-lever a cam, G′, on the driving-shaft acts to cause the same to vibrate forward and backward once at each revolution thereof, and consequently to move the ratchet-wheel one notch. The notches in the ratchet-wheel correspond in position with the cam-projections on the pattern-wheel. Thus, as shown in the drawings, which represent a pattern-wheel for narrowing the toes of stockings, having its cam-projections at uniform distances apart, there are three notches in the ratchet-wheel for each cam-projection on the pattern-wheel—one notch opposite to each projection and two notches opposite to each space between the projections; and since, when the cam-point of the lever C′ is down in these spaces, the shifting block is raised to its highest position, and the driving-shaft is thereby brought into position for knitting, and when the cam-point is on a cam-projection of the pattern-wheel the shifting block is thereby brought to its lowest position and the driving-shaft is thrown into position for narrowing, the effect of the construction of pattern-wheel described is to knit two courses and then narrow one stitch of the last of the said two courses alternately.

It is obvious that the pattern-wheel may be constructed to produce any form of narrowing and shaped work within practicable limits. When long portions of straight work intervene between the narrowings the pattern-wheel may be thrown into and out of action by hand; but the entire operation is easily effected automatically and continuously for knitting shirts, drawers, or any kind of article. To accomplish this a Jacquard mechanism is combined with or takes the place of the pattern-wheel, the simplest way of constructing which is to form the cam-projections for operating the shifting block on Jacquard links, which travel on a simple sprocket-wheel in place of the pattern-wheel, and turned by the same means. Where no narrowing is to take place the cam-projections on the Jacquard links are of course omitted.

The narrowing movement is stopped automatically by simply having one tooth omitted on the ratchet wheel, as at 32, there being in the pattern-wheel a space, 33, of greater extent than the other spaces between the cam-projections opposite to the said space where the ratchet-tooth is omitted, it being understood that a narrowed section of the fabric is completed in one revolution of the ratchet-wheel.

The narrowing mechanism is again brought into action at the will of the operator by simply moving the ratchet-wheel the distance of one or two notches by hand, so as to engage the pawl E′ with a tooth thereof.

In the machine above described the sliding movement of the driving-shaft is effected whenever a cam-projection of the pattern-wheel is moved beneath the lever of the shifting block A′, and such movement of the driving-shaft causes the respective cams to operate the rocking bar O, (by which a covering-point is entered into the eye of one of the series of eye-pointed latch-needles and is raised therefrom,) the back sinker-bar, J, (by which the loop of yarn is moved from one of the eye-pointed latch-needles to the covering-point,) the front sinker-bar, M, (by which the said loop of yarn is moved backward from the covering-point to the next eye-pointed latch-needle of the series,) and the slide Y, (by which the eye-pointed latch-needle from which the loop has been removed is dropped or depressed from the series of eye-pointed latch-needles remaining in knitting positions.) In said machine, therefore, the said pattern-wheel determines the time or occasions at which each of said devices (rocking bar, back sinker-bar, front sinker-bar, and slide) operates in combination with the series of eye-pointed latch-needles for the purpose of transferring a loop of yarn from the eye-pointed latch-needle on which it is formed to the next adjacent eye-pointed latch-needle of the series.

Having thus described a machine embodying my invention, I declare that I am aware that long previous to my invention knitting-machines were constructed with spring-needles combined with narrowing devices at both ends of the series of spring-needles, the said narrowing devices in some cases (as in the Kilbourne machines) being arranged to operate separately, so that knitting may progress at one edge of the fabric while the narrowing is effected at the other edge, and the narrowing devices in other cases (as in the Paget machines) being arranged to operate simultaneously, so that the knitting is intermitted at both sides of the fabric during narrowing.

I am also aware that knitting-machines have been constructed with plain latch-needles, (without eyes at or near their points.) I therefore do not claim as a part of my invention the employment of two sets of narrowing devices, or two sets of narrowing devices operating simultaneously; nor do I claim in this patent a latch-needle as a new instrument.

What I claim in this patent as my invention is—

1. The combination, substantially as before set forth, of the series of eye-pointed latch-needles, the covering-point, and the rocking bar by which the covering-point is engaged in and is removed from the eyes of the eye-pointed latch-needles.

2. The combination, substantially as before set forth, of the series of eye-pointed latch-needles, the covering-point, the rocking bar, and the pattern-wheel by which the times at which the rocking bar is operated are determined.

3. The combination, substantially as before set forth, of the series of eye-pointed latch-needles, the covering-point, the back sinker-bar, by whose action a loop is moved from an eye-pointed latch-needle to a covering-point, and the front sinker-bar, by whose action a loop is moved back from a covering-point to an eye-pointed latch-needle.

4. The combination, substantially as before set forth, of the series of eye-pointed latch-needles, the covering-point, the back sinker-bar, the front sinker-bar, and the pattern-wheel, by which the times at which the covering-point and sinker-bars are to operate are determined.

5. The combination, substantially as before set forth, of the series of eye-pointed latch-needles, the covering-point, the back sinker-bar, the front sinker-bar, the needle-bar, and the slide by which the needles of the end of the series are depressed and raised.

6. The combination, substantially as before set forth, of the series of eye-pointed latch-needles, the covering-points, the back sinker-bar, the front sinker-bar, the needle-bar, the slide by which the needles at the end of the series are depressed and raised, and the pattern-wheel, by which the times at which said needles are successively depressed are determined.

In witness whereof I have hereto set my hand this 2d day of June, A. D. 1881.

WM. H. ABEL.

Witnesses:
WM. H. SANBORN,
GEORGE R. LEAVITT.